United States Patent [19]
Kochi

[11] Patent Number: 5,689,321
[45] Date of Patent: Nov. 18, 1997

[54] DISPLAY APPARATUS

[75] Inventor: Tetsunobu Kochi, Hiratsuka, Japan

[73] Assignee: Canon Kabushiki Kaisha, Tokyo, Japan

[21] Appl. No.: 629,747

[22] Filed: Apr. 9, 1996

[30] Foreign Application Priority Data

Apr. 13, 1995 [JP] Japan ................................ 7-088423

[51] Int. Cl.$^6$ ........................ G02F 1/1343; G02F 1/1335
[52] U.S. Cl. ........................ 349/143; 349/139; 349/8
[58] Field of Search ........................ 349/139, 143, 349/106, 130

[56] References Cited

U.S. PATENT DOCUMENTS

| | | | |
|---|---|---|---|
| 4,335,937 | 6/1982 | Takamatsu et al. | 349/143 |
| 4,712,877 | 12/1987 | Okada et al. | 349/143 |
| 4,904,060 | 2/1990 | Grupp | 349/139 |
| 5,422,747 | 6/1995 | Wakita | 349/143 |
| 5,526,149 | 6/1996 | Kanbe et al. | 349/139 |

*Primary Examiner*—Anita Pellman Gross
*Assistant Examiner*—Toan Ton
*Attorney, Agent, or Firm*—Fitzpatrick, Cella, Harper & Scinto

[57] ABSTRACT

A display apparatus comprising a reflective type panel displaying images by reflecting the light from at least one light source, wherein each of a plurality of pixel electrodes of the reflective type panel is composed of a reflective electrode. Each inclination angle of the pixel electrodes with respect to the panel surface is arranged to be different from others.

15 Claims, 5 Drawing Sheets

DISPLAY APPARATUS

BACKGROUND OF THE INVENTION

1. Field of the Invention

The present invention relates to a display apparatus displaying high-resolution television images.

2. Description of the Related Art

Recently, intense efforts have been made to develop projecting-system display apparatuses in order to display large pictures with a diagonal line of, e.g., more than 40 inches. Some of such display apparatuses use liquid crystal panels or digital micromirror devices. Among them, those apparatuses employing reflective type liquid crystal panels are expected to have a successful future, since such apparatuses can readily provide large projected pictures by magnifying and projecting images on screens using liquid crystal panels having a diagonal line of several inches.

To achieve multi-color (256 colors or more) display, one type of the reflective type liquid crystal display apparatuses is provided with three liquid crystal panels corresponding to red, green, and blue. Meanwhile another type has only one liquid crystal panel equipped with color filters for red, green and blue therein.

With respect to the former, i.e., the three-panel system, three expensive liquid crystal panels and an optical system for integrating colors are required, resulting in a large and costly system. Concerning the latter, i.e., the single panel system, it is necessary to prepare a tiny color filter for each of the pixels on the chip within the liquid crystal panels. The yield of the panel production is thus decreased and the cost is increased.

SUMMARY OF THE INVENTION

An object of the present invention is to provide such a display apparatus that can be produced in a small size at low cost and can display high-resolution images.

According to the present invention, a display apparatus comprises a reflective type device displaying an image by reflecting the light from at least one light source, wherein each of pixel electrodes of the reflective type device is composed of a reflective electrode and at least one of the pixel electrodes has a different inclination angle from others.

It is preferred that the light source comprises three light sources separately positioned and the light from each of the light sources is reflected by the pixel electrodes so as to be converged to one focus.

It is also preferred that the light from the light source is reflected by the pixel electrodes so as to be converged to two foci.

Further, it is preferred that the light from the light source is converted to parallel light with respect to the reflective type device.

Furthermore, it is preferred that each of the light sources is detachably provided with a color filter having corresponding color on the light path.

Moreover, a convex lens may be arranged near the focus of the reflected light to project an image on a screen or to directly view an image by viewer's eyes.

In accordance with the present invention, the light beams irradiated from the light sources are reflected by the corresponding reflective electrodes composing the pixel electrodes of the reflective device, and then, converged. When the light beams from the light sources are irradiated through the color filters, a multi-color (256 colors or more) image can be displayed at a focus according to a signal applied to the reflective device. By viewing the image through a lens or by projecting the image on a screen, it is possible to obtain a high-resolution image.

Further objects, features and advantages of the present invention will become apparent from the following description of the preferred embodiments with reference to the attached drawings.

DETAILED DESCRIPTION OF THE PREFERRED EMBODIMENTS.

First Embodiment

Figure 1:
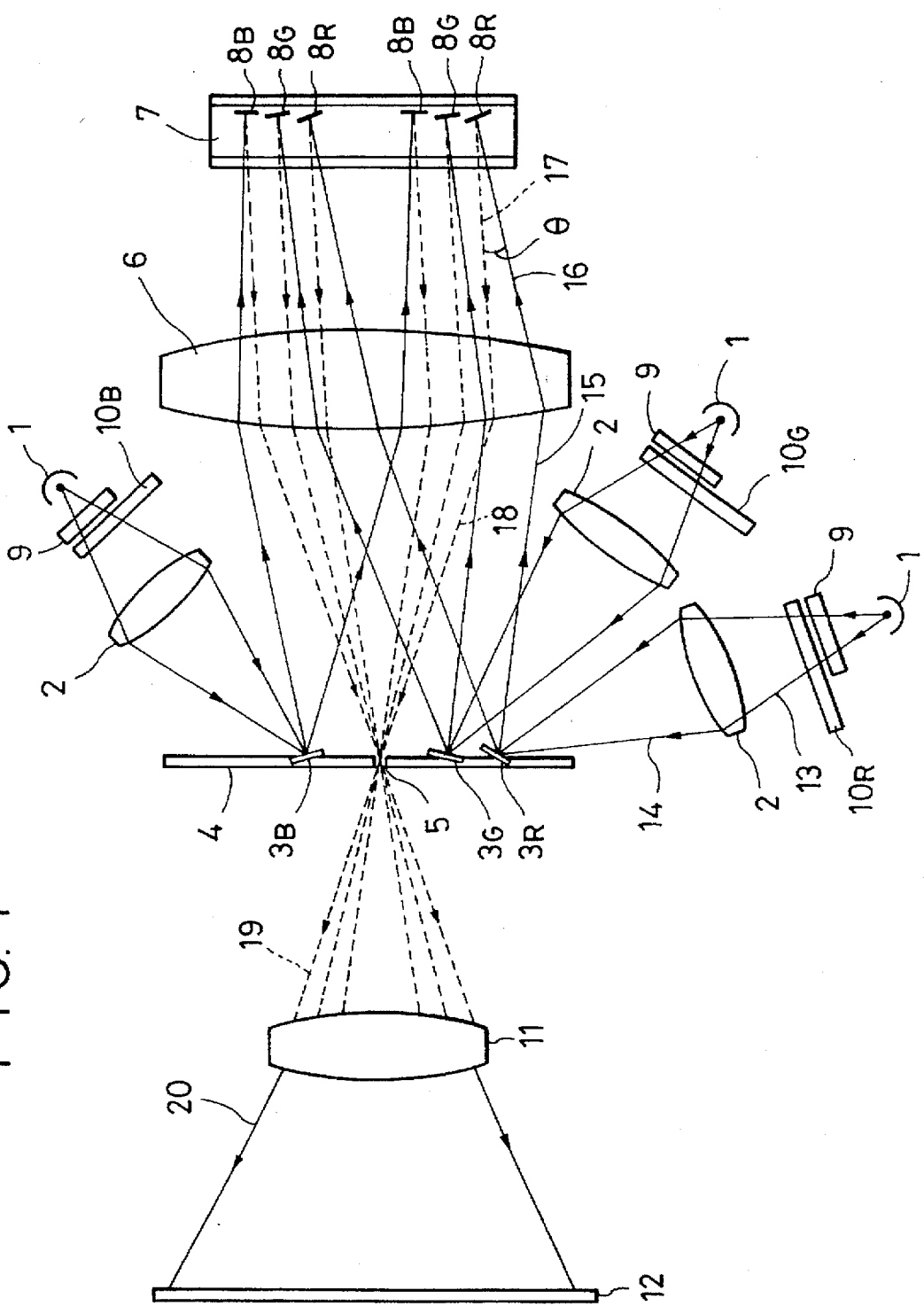
FIG. 1 is a diagram of the first embodiment of the present invention.

FIG. 1 shows the features of the first embodiment, wherein the present invention is applied to a liquid crystal display apparatus. A telecentric optical system is composed of light sources 1, condensing lenses 2, micromirrors 3 including 3B, 3G, and 3R, a light shielding plate 4, a pin hole (or a slit) 5, and a lens 6, as is shown in FIG. 1. The light shielding plate 4, the micromirrors 3, and the pin hole 5 are arranged at the focus of the lens 6.

Reflective pixel electrodes 8 including 8B, 8G, and 8R are built-in a reflective type liquid crystal panel 7. Each inclination angle of the electrodes 8 depends on the color of the corresponding pixel. A polymer dispersed liquid crystal panel is preferably used as the liquid crystal panel 7 because the light scattering ability thereof can be switched according to the applied voltage. Although other liquid crystal panels, such as guest-host type liquid crystal panels, may be employed instead.

By the use of infrared-light cutting plates 9 and color-filter switching arrangements 10 including 10B, 10G, and 10R, it is possible to illuminate the subject in either way using one of color filters of red, green, and blue or without using any color filter.

In the figure, there is also shown a projection lens 11, a screen 12, and light beams 13 to 20.

According to the present embodiment, three sets of the light source systems are employed to achieve color display and are arranged corresponding to red, green, and blue.

For example, only the red-color light is allowed to pass through the infrared-light cutting plate 9 and the color-filter switching arrangement 10R, and then, the light is converged to the micromirror 3R by the use of the condensing lens 2. The micromirrors 3 can be formed in a small size because they are positioned at the foci of the lens 6. Positions and inclination angles of the micromirrors 3 are different from one another depending on the arrangement of the corresponding light sources 1. Since the micromirrors 3 are positioned at the foci of the lens 6, a light beam 14 reflected by the micro-mirror 3R impinges upon the lens 6 as a parallel light beam 15. After passing through the lens 6, the parallel light beam 15 impinges upon the liquid crystal panel 7 as an incident light beam 16 and is reflected by the reflective pixel electrode 8R in the liquid crystal panel 7. A reflected light beam 17 forms an angle of 0 with respect to the incident light beam 16.

By the lens 6, the reflected light beam 17 is converged to the pin hole 5 as a light beam 18. Depending on the arrangement of the corresponding micro-mirrors 3 and light sources 1, the inclination angles of the reflective pixel electrodes 8 are set up to converge the light beams. If the light beam impinges upon the reflective pixel electrodes 8B and 8G of which inclination angles are different from that of the reflective pixel electrode 8R, the light beam will not be converged to the pin hole 5 but will be cut by the light shielding plate 4.

By the use of the above-described construction, color display is achieved in the single-panel system by assigning red, green, and blue to the corresponding pixels.

The foregoing explanation is, however, acceptable only when the light beams are not scattered in the liquid crystal panel 7. Meanwhile, if the light beams are scattered, they are cut by the light shielding plate 4 and cannot pass through the pin hole 5 because the light beams reflected from the panel hardly contain any parallel component therein.

After passing through the pin hole 5, a light beam 19 is projected on the screen 12 by the projection lens 11.

Each of the color-filter switching arrangements 10 is composed of a corresponding color filter of red, green, or blue. Since those filters are not formed on the corresponding chips of the liquid crystal panel, simple and high-yield production is achieved at low cost. In addition, by the use of the color-filter switching arrangements, it is possible to readily select monochrome display or multi-color (256 or more colors) display at high resolution.

According to the conventional single-panel system, one pixel is composed of three color dots to display in multi-color while in the present invention one pixel is composed of one color dot projected images with higher resolution are thereby obtained. For instance, an apparatus incorporated in the present invention is able to achieve presentation which is more effective and easier to understand as compared to the conventional apparatuses by switching the display mode between the multi-color mode for displaying photographs, pictures, etc. and the monochrome mode for displaying characters or the like.

Further, by applying the liquid crystal panel incorporating the present invention to a single-panel system apparatus, it becomes possible to produce the apparatus in a compact form at low cost because the optical system of the single-panel system is simpler than that of the three-panel system. It is also possible to avoid the problem in the conventional multiple-consecutive-projection system in which the positioning of the displayed images on the screen is difficult.

Figure 2:
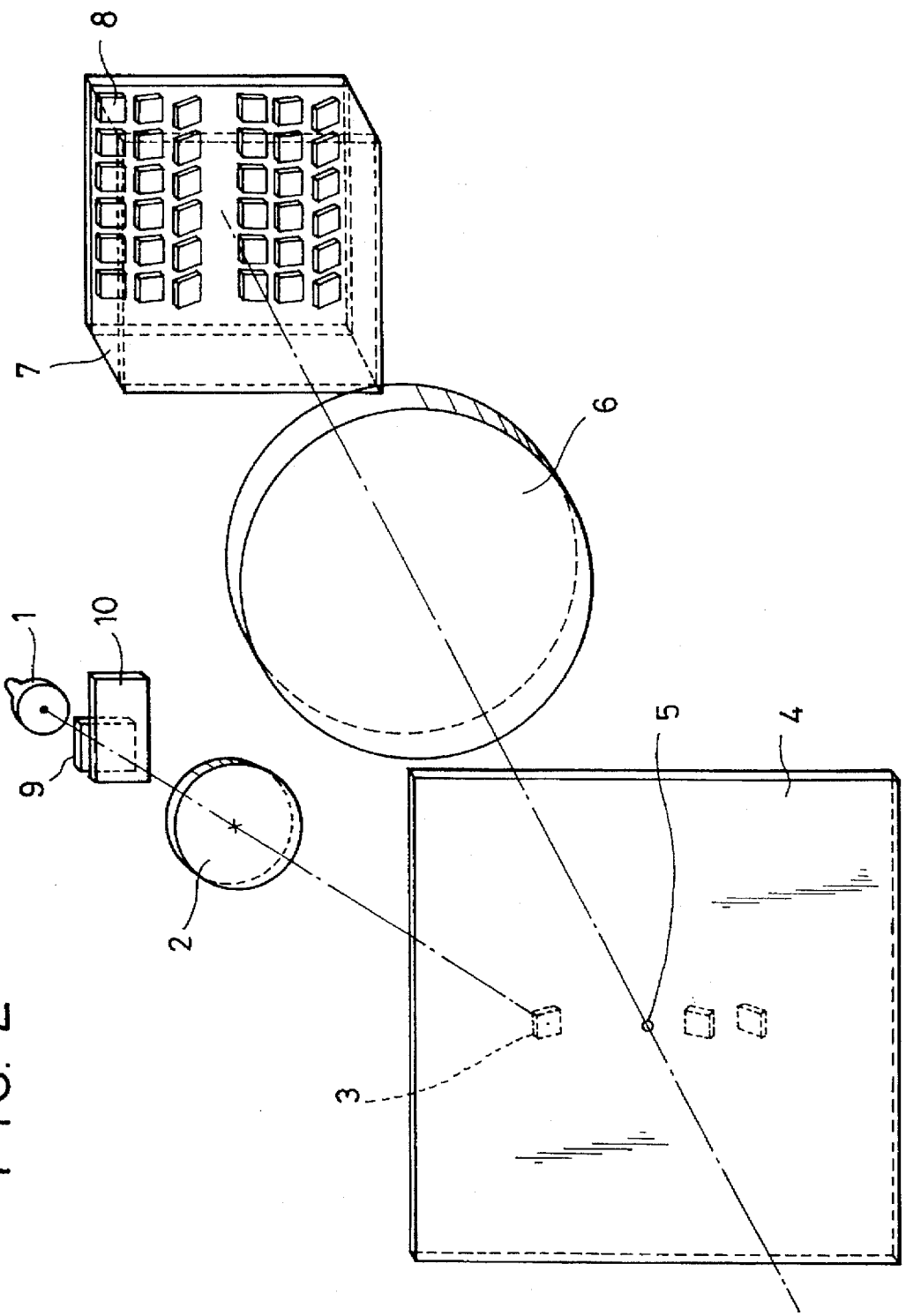
FIG. 2 is a perspective side view of the display apparatus shown in FIG. 1.

FIG. 2 is a diagrammatic view showing the stereoscopic construction of the display apparatus according to the first embodiment. Since the light beams are irradiated as parallel beams from the lens 6 to the liquid crystal panel 7, the aforementioned effect can be obtained by arranging each of the reflective pixel electrodes 8 to have an inclination angle corresponding to one of the three colors of red, green, and blue.

Figure 3:
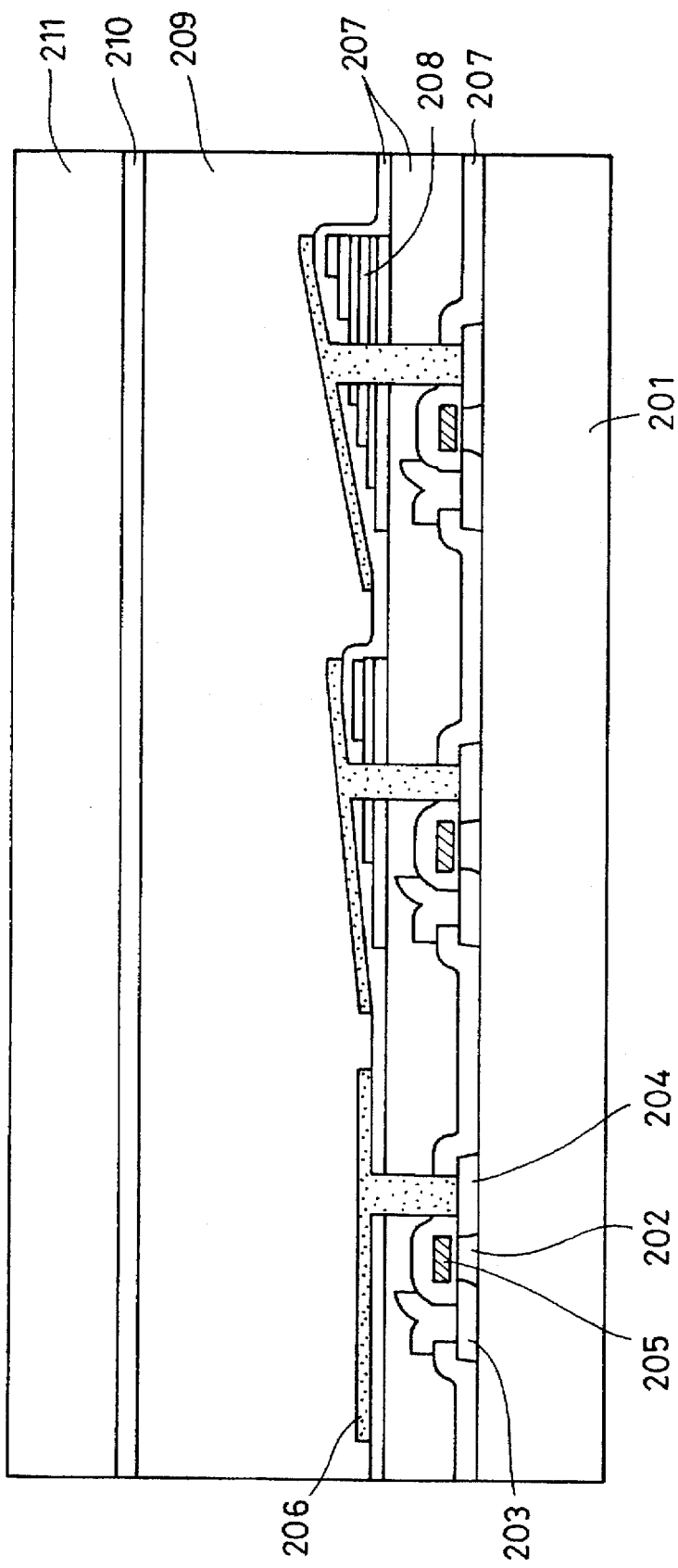
FIG. 3 is a sectional view of the liquid crystal panel shown in FIG. 1.
Figure 4A:
FIG. 4a–e are a simplified flow-sheet of the fabricating processes for the liquid crystal panel shown in FIG. 3.
Figure 4B:
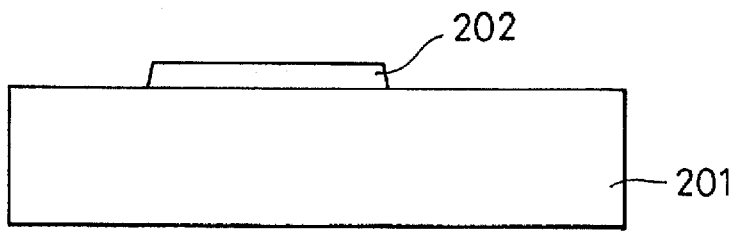
Figure 4C:
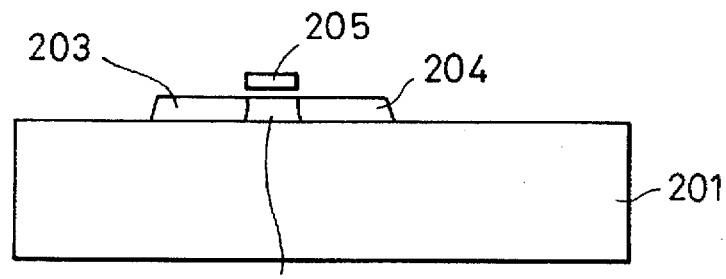
Figure 4D:
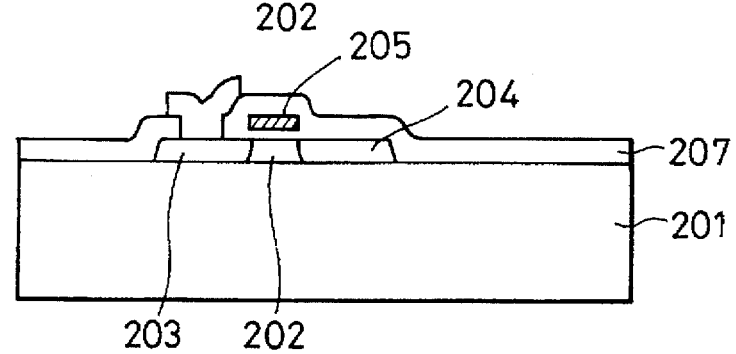
Figure 4E:
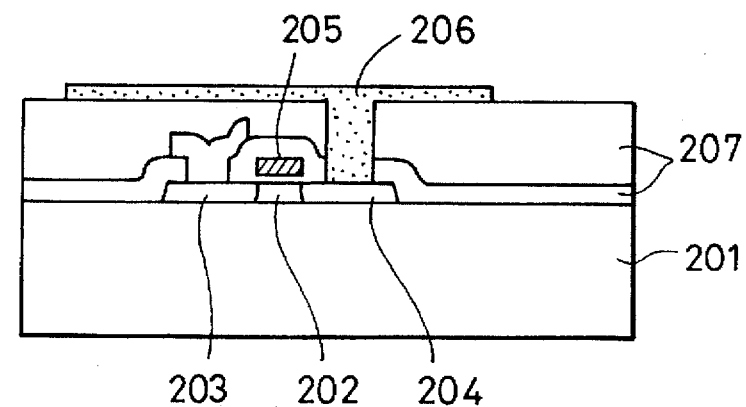

FIG. 3 is a sectional view of the liquid crystal panel 7.

A substrate 201 is made of, e.g., Si, quartz, glass, alumina, ceramic, or metals, and Si layers 202 are semiconductor bodies in which transistors of the pixel areas are formed. Examples of the pixel-area transistors to be used as the functional elements are as follows: single-crystal transistors prepared on Si substrates or silicon on insulator (SOI) substrates; and polycrystal Si or amorphous Si transistors formed on glass or quartz substrates. Instead of those transistors, other functional elements, such as the two-terminal elements including diodes and metal insulator metals (MIM) may be used. In the figure, there is also shown source regions 203 and drain regions 204 of the transistors, gate electrodes 205, each of which is formed on each Si layer 202 and has a gate oxide film therebetween, and reflective pixel electrodes 206 connecting to the drains 204 of the transistors. The reflective pixel electrodes 206 are made of a reflective conductive material composed of a metal, including aluminum, silver, and gold, or an alloy.

In the figure, first interlayer insulating films 207 are shown. Second interlayer insulating films 208 are used for giving desired slopes to the reflective pixel electrodes 206. For instance, the desired slopes can be attained as follows; the first interlayer insulating films 207 are prepared using silicon oxide films; then silicon nitride films are deposited thereon and patterned so as to form the second interlayer insulating films 208.

A practical example of a liquid crystal 209 is the polymer dispersed liquid crystal. The reference numerals 210 and 211 indicate an opposed transparent electrode and an opposed transparent substrate, respectively. The inclination angles of the reflective electrodes with respect to the opposed transparent substrate 211 are arranged correspondingly to the positions of the pixels thereof, which means the positions of the reflective electrodes thereof. It is thereby possible to prevent the light reflected by the surface of the transparent substrate 211 from being converged to the pin hole 5. As a result, an decrease in contrast can be also avoidable.

FIG. 4 is a simplified flow-sheet of the fabricating process for a liquid crystal display apparatus incorporated with the present embodiment. Such as a glass or quartz substrate is used as a substrate 201 shown in FIG. 4a. A silicon or SOI substrate may be also employed. As shown in FIG. 4b, a silicon layer 202 is prepared on the substrate 201, and then, subjected to etching in order to prepare a region on which a transistor will be formed. After oxidizing the silicon layer 202 by heating or after preparing a gate insulating film by depositing, the gate electrode 205 is formed by depositing and etching polycrystal silicon, etc. Then ions are implanted using the gate electrode as a mask, and the source 203 and the drain 204 are produced by self-aligning, as is shown in FIG. 4c. An interlayer insulating film 207 made of silicon oxide, silicon nitride, or the like is coated thereon and a contact hole is made in the interlayer insulating film 207. A source electrode connecting to the source 203 is formed by depositing and patterning a conductive film made of Al, etc. on the interlayer insulating film 207 and also in the contact hole, as shown in FIG. 4d. Furthermore, another interlayer insulating film 207 made of silicon oxide, silicon nitride, or the like is coated thereon and a second contact hole is made in the interlayer insulating film 207. A reflective pixel electrode 206 is formed by depositing and patterning a high-reflective conductive film made of Al, etc., on the interlayer insulating film 207 and also in the second contact hole, as shown in FIG. 4e.

Before preparing the pixel electrode 206, at least one layer of the second interlayer insulating film, indicated by the reference numeral 208 in FIG. 3, is deposited and patterned on the interlayer insulating film 207. This process is repeated at least once to provide a desired slope to the pixel electrode 206. When a material having a low softening temperature, for example, a phosphorus glass, is deposited on the second interlayer film, a smooth surface without any step can be readily obtained by heating. It is thus possible to more precisely design the inclination angle of the reflective surface of the reflective electrode 206 by setting it up on a smooth surface.

In addition to the device substrate provided with the above 15 transistor, another transparent electrode 210 is formed on another transparent substrate 211. In this case, the transparent electrode 210 is made of, e.g., a transparent indium tin oxide (ITO) film.

The above two substrates are combined in an opposed position, and a liquid crystal is provided therebetween. A polymer dispersed liquid crystal produced by impregnation, suspension, phase separation, or the like is a practical example of the liquid crystal, however, other kinds of liquid crystals may be used instead.

The reflective type liquid crystal panel used for the present embodiment is prepared according to the above-mentioned manner. Although the second interlayer insulating films 208 are utilized to attain the desired inclination angle, it is not so restricted. The desired inclination angle may be achieved by combining the step-like shapes of the transistor components, such as the silicon layer 202, the gate electrode 205 and the source electrode 203. The arrangement of the optical system comprising light sources, lenses and mirrors is determined in accordance with the inclination angles of the reflective pixel electrodes.

second Embodiment

Figure 5:
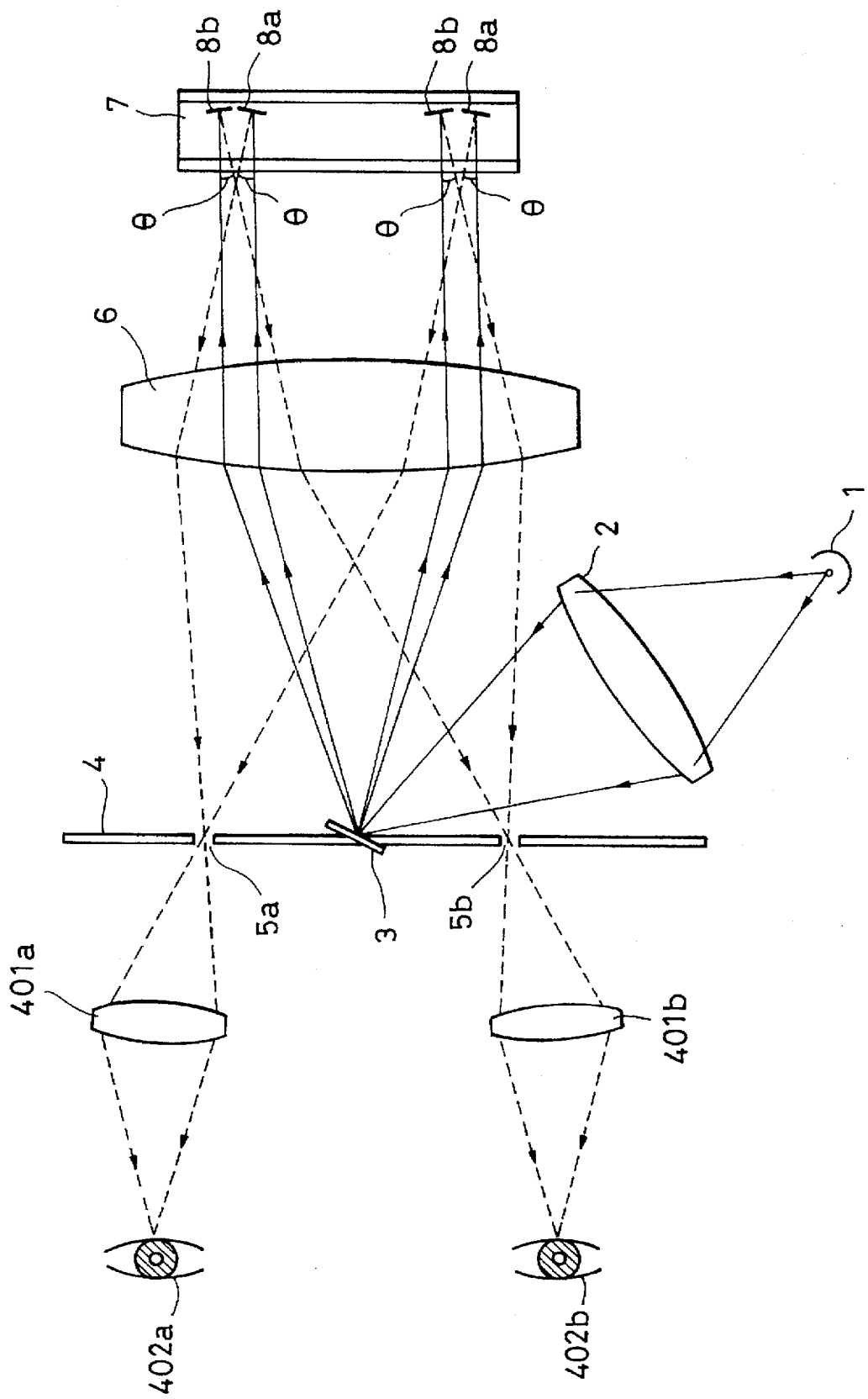
FIG. 5 is a diagram of the second embodiment incorporated in the present invention.

FIG. 5 shows the features of the second embodiment incorporated in the present invention. There is shown condensing lenses 401a and 401b, and viewer's eyes 402a and 402b. In the present embodiment, each of the reflective pixel electrodes 8a and 8b has a different inclination angle from each other in order to converge the light reflected thereby to a pin hole (or a slit) 5a or 5b, correspondingly.

After passing through the corresponding pin holes (or slits) 5a and 5b, the light beams are converged at the corresponding condense lenses 401a and 401b. By setting the inclination angle of each reflective pixel electrode such that each light beam reflected thereby is converged to either the right eye or the left eye, various kinds of display are achieved, e.g., displaying separate projected images for the right eye and the left eye by one liquid crystal panel, displaying stereoscopic projected images utilizing parallax, and displaying wide-field projected images.

Third Embodiment

As a reflective type display apparatus, a digital micromirror device has been reported, for example, by Hornbeck, L presentation No. 15.1 in IEDM of 1993 in December 1993.

In accordance with the digital micromirror device, the reflective electrodes are supported by hinges, and monochrome display is achieved by altering the angle of the electrodes using static electricity. The digital micromirror devices can provide a similar effect to the first and the second embodiments by arranging the inclination angles of the pixel electrodes of the panel in a similar way to those shown in FIGS. 1 and 5.

For instance, color display is achieved by setting the inclination angles of the reflective pixel electrodes at three or more values and by preparing light sources for red, green, and blue corresponding to the inclination angles. In this case, the mechanical portion used for filter rotating, as is described in the presentation, is not required. Therefore, the system as a whole can be simplified.

Differently from the apparatus employing a liquid crystal, the digital micromirror devices display the dark state by altering the inclination of the mirror. In other words, to display the clear state, the inclination of the mirror is set up to allow the reflected light to pass through the pin hole, as is shown in FIGS. 1 and 5. To display the dark state, the inclination of the mirror is electrically arranged such that the reflected light is not allowed to pass through the pin hole.

As afore-described, according to the present invention, it becomes possible to produce a display apparatus in a compact form at low cost by arranging the inclination angles of the reflective electrodes at different values. Further, the apparatus of the present invention is also advantageous because positioning of the displayed images of red, green, and blue projected on the screen is not necessary when being applied to a projector.

In addition, it becomes possible to readily switch the display mode between the monochrome and multi-color modes. Stereoscopic display, plural-image display, and wide-field display are also realized in a simple assembly, and furthermore, they are switchable.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims.

What is claimed is:

1. A display apparatus comprising a reflective type device displaying an image by reflecting the light from at least one light source, wherein each of pixel electrodes of said reflective type device is composed of a reflective electrode and at least one of said pixel electrodes has a different inclination angle from others.

2. A display apparatus as set forth in claim 1, wherein said light source comprises three light sources separately positioned, and the light from each of said light sources is reflected by said pixel electrodes so as to be converged to one focus.

3. A display apparatus as set forth in claims 2, wherein a convex lens is arranged near said focus of said reflected light.

4. A display apparatus as set forth in claim 2, wherein the light from said light source is converted to parallel light with respect to said device.

5. A display apparatus as set forth in claim 2, wherein each of said light sources is detachably provided with a color filter having corresponding color on the light path.

6. A display apparatus as set forth in claim 1, wherein the light from said light source is reflected by said pixel electrodes so as to be converged to two foci.

7. A display apparatus as set forth in claim 6, wherein each of said light sources is detachably provided with a color filter having corresponding color on the light path.

8. A display apparatus as set forth in claim 6, wherein a convex lens is arranged near said focus of said reflected light.

9. A display apparatus as set forth in claim 1 wherein the light from said light source is converted to parallel light with respect to said device.

10. A display apparatus as set forth in claim 1, wherein each of said light sources is detachably provided with a color filter having corresponding color on the light path.

11. A display apparatus as set forth in claim 1, wherein said reflective type device is a liquid crystal device.

12. A display apparatus as set forth in claim 1, wherein said reflective type device is a digital micromirror device.

13. A display apparatus as set forth in claim 1, wherein said inclination angles of said pixel electrodes are arranged in response to the positions of said light source and a hole or slit through which said reflected light passes.

14. A display apparatus as set forth in claim 1, wherein the positions of said light source and a hole or slit through which said reflected light passes are arranged at the positions corresponding to said inclination angles of said pixel electrodes.

15. A reflective display device for displaying an image by reflecting the light from a light source, comprising a plurality of pixel electrodes composed of reflective electrodes, wherein one of said pixel electrodes has a different inclination angle from others.

* * * * *

UNITED STATES PATENT AND TRADEMARK OFFICE
CERTIFICATE OF CORRECTION

PATENT NO. : 5,689,321
DATED : November 18, 1997
INVENTOR(S) : Kochi

It is certified that error appears in the above-identified patent and that said Letters Patent is hereby corrected as shown below:

COLUMN 3:

Line 3, "0" should read --$\theta$--.
Line 38, "dot projected" should read --dot. Projected--.

COLUMN 5:

Line 7, "15" should be deleted.
Line 38, "condense" should read --condensing--.

COLUMN 6:

Line 38, "claims" should read --claim--.

Signed and Sealed this

Twenty-eighth Day of July, 1998

Attest:

BRUCE LEHMAN

*Attesting Officer*       *Commissioner of Patents and Trademarks*